United States Patent [19]

Nahumi

[11] Patent Number: 5,512,953
[45] Date of Patent: Apr. 30, 1996

[54] METHOD AND APPARATUS FOR CONVERSION OF COMPRESSED BIT STREAM REPRESENTATION OF VIDEO SIGNAL

[75] Inventor: Dror Nahumi, Wayside, N.J.

[73] Assignee: AT&T Corp., Murray Hill, N.J.

[21] Appl. No.: 287,990

[22] Filed: Aug. 9, 1994

[51] Int. Cl.⁶ .......................... H04N 7/01; H04N 7/015; H04N 7/26
[52] U.S. Cl. ........................................ 348/441; 348/416
[58] Field of Search ........................... 348/441, 445, 348/458, 389, 388, 415, 416, 417, 426, 427, 431, 430, 400–402, 403–405, 409, 420, 443, 453, 554, 555, 556; H04N 7/01, 7/015, 7/26

[56] References Cited

U.S. PATENT DOCUMENTS

| | | | |
|---|---|---|---|
| 5,028,995 | 7/1991 | Izawa et al. | 348/402 |
| 5,262,854 | 11/1993 | Ng | 348/416 |
| 5,379,072 | 1/1995 | Kondo | 348/441 |
| 5,408,274 | 4/1995 | Chang et al. | 348/700 |
| 5,414,469 | 5/1995 | Gonzales et al. | 348/408 |

OTHER PUBLICATIONS

"Line Transmission on Non-Telephone Signals. Video Codec for Audiovisual Services at px64 kbit/s," Recommendation H.261, CCITT, The International Telegraph and Telephone Consultative Committee, Geneva, 1990, 29 pages.

Netravali, A., et al., "A Codec for HDTV," IEEE Transactons on Consumer Electronics, vol. 38, No. 3, Aug. 1992, pp. 325–340.

Netravali, A., Haskel, B. G., *Digital Pictures. Representation and Compression*, Plenum Press, New York and London, pp. 204, 205, 334, 335.

*Primary Examiner*—James J. Groody
*Assistant Examiner*—Safet Metjahic

[57] ABSTRACT

A compressed bit stream converter is utilized for converting the video signal parameter bit stream representations of a video signal that are encoded using the temporal and spatial resolution characteristics of a first video transmission standard to the video signal parameter bit stream representations of the video signal that are encoded using the temporal and spatial resolution characteristics of a second video transmission standard. The representation of the video signal remains in compressed form and is not converted back into video signal form using a video encoder during the conversion between the compressed bit streams encoded using the first and second video transmission standard.

22 Claims, 4 Drawing Sheets

METHOD AND APPARATUS FOR CONVERSION OF COMPRESSED BIT STREAM REPRESENTATION OF VIDEO SIGNAL

FIELD OF THE INVENTION

This invention relates generally to the transmission of video images. More particularly, the present invention relates to a method and apparatus for converting a compressed bit stream representation of a video signal encoded using a first video transmission standard to a compressed bit stream representation of the video signal encoded using a second video transmission standard.

BACKGROUND OF THE INVENTION

Video signals are transmitted between a video transmission source and a video receiving unit in a video intercommunication system as a representative stream of digital data bits known as a compressed or encoded bit stream. A video encoder in the transmission source is utilized for encoding a video signal using a specified video transmission standard. The video transmission standard defines the spatial and temporal resolution, such as the image resolution and the image frame rate, respectively, used for encoding a video signal. A video decoder in the receiving unit decodes or decompresses the compressed bit stream back into video signal form.

Advances in video transmission technology have led to the development of video encoding and video decoding equipment which may be configured to operate using a variety of video transmission standards. The video receiving equipment which includes a video decoder, however, can only decode a compressed bit stream that it receives which is encoded using the same video transmission standard as that which the video decoder is configured to perform decoding. The high likelihood that video signals encoded using a first video transmission standard will be received at video decoding equipment configured to operate using a video transmission standard other than the first video transmission standard establishes a need for an economical and efficient method for converting a first compressed bit stream encoded using a first video transmission standard to a second compressed bit stream encoded using a second video transmission standard.

A standard approach is to convert a first compressed bit stream back to video signal form, and then to utilize an additional video encoder, which is configured to encode video signals using the second video transmission standard, as part of the video decoding equipment, for converting the video signal to a second compressed bit stream. The use of the additional video encoder, however, enormously increases the cost of the video decoding equipment, such as a television set, that includes the video decoder utilized for displaying a video signal. The additional video encoder also increases the cost of video transmissions in terms of processing time.

Further, the use of a video encoder for converting between compressed bit streams encoded at different video transmission standards fails to compensate efficiently for possible differences in the encoded parameters of a video signal which are a function of the video transmission standard. For instance, a high image resolution video encoder cannot compensate for the fact that the video signal it is re-compressing may have been initially encoded by a video encoder configured to operate using a video transmission standard having a lower image resolution.

SUMMARY OF THE INVENTION

The present invention provides a method and apparatus for the conversion of a compressed bit stream representation of a video signal that is encoded using a first video transmission standard to a compressed bit stream representation of the video signal that is encoded using a second video transmission standard without decompressing the compressed bit stream into video signal form.

In one embodiment, the method and apparatus of this invention comprises as a first step of receiving in a synchronizer circuit a first compressed bit stream representative of a plurality of moving video image frames that is comprised of a plurality of entropy encoded video signal parameter bit streams and is encoded using a first video transmission standard. The synchronizer then identifies which bits in the first compressed bit stream represent each moving video image frame. An entropy decoder/video signal parameter extracter circuit then extracts the plurality of entropy encoded video signal parameter bit streams from the first compressed bit stream and then entropy decodes the plurality of entropy encoded video signal parameter bit streams. A parameter rate controller circuit converts the plurality of video signal parameter bit streams that is encoded using the first video transmission standard to a plurality of video signal parameter bit streams that is encoded using a second video transmission standard. An entropy encoder/video signal parameter synthesizer circuit entropy encodes the converted plurality of video signal parameter bit streams and then multiplexes the entropy coded converted plurality of video signal parameter bit streams to provide a second compressed bit stream encoded using the second video transmission standard.

In a further embodiment, a dequantizer circuit removes quantization from a video signal parameter bit stream that is comprised of a discrete cosine transform (DCT) coefficients prior to conversion, and a quantizer circuit then quantizes the converted DCT coefficients prior to entropy encoding and multiplexing.

The conversion may be performed by using either interpolation or decimation techniques, depending on the spatial and temporal resolution characteristics, such as the image frame rate or image resolution, of the first video transmission standard and the second video transmission standard.

Other features and advantages of the present invention will be readily apparent from the detailed description that follows.

DETAILED DESCRIPTION

Figure 1:
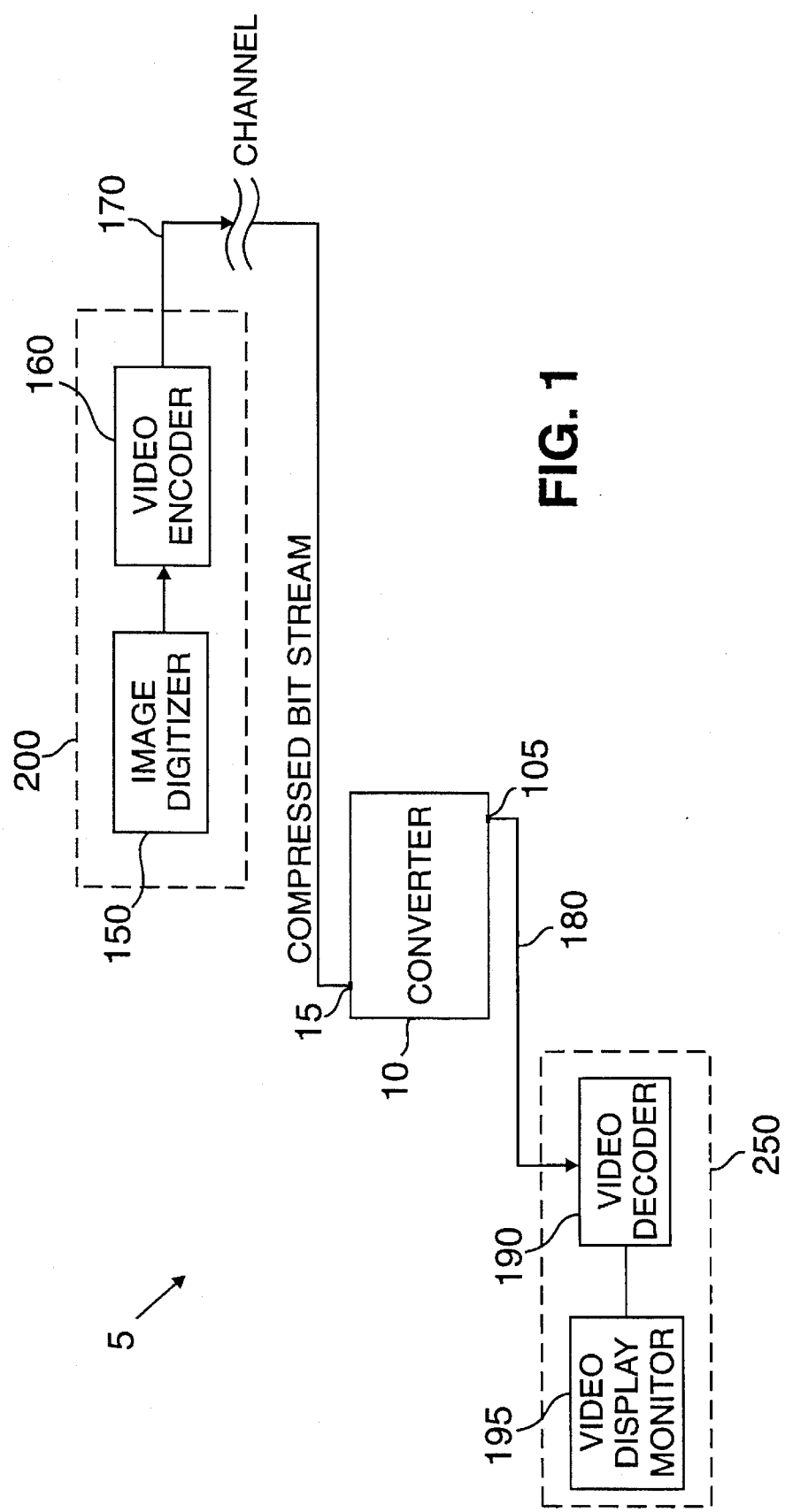
FIG. 1 is a block diagram of a video intercommunication system utilizing a compressed bit stream converter according to the present invention.

A video intercommunication system 5 is shown in FIG. 1. The system 5 generally comprises a video transmission terminal 200, a video reception terminal 250 and a compressed bit stream converter 10. The converter 10 is described in greater detail below with reference to FIG. 3, after a description is provided of how a video signal representation of moving video image frames is processed for transmission in compressed form in a video intercommunication system.

The transmission terminal 200 may suitably comprise an image digitizer 150 connected to a video encoder 160. A transmission channel 170 connects the video encoder 160 to an input 15 of the converter 10.

The reception terminal 250 may suitably comprise a video decoder 190 and a video display monitor 195. The video decoder 190 is connected to the video display monitor 195. A reception channel 180 connects an output 105 of the converter 10 to the video decoder 190.

The image digitizer 150 initially stores a spatial representation of the light energy intensity variations of a moving video image frame as an n×m matrix of picture elements or pixels, where n is defined as the number of picture lines per image frame and m is defined as the number of pixels per picture line. The specific values of n and m are not important for purposes of describing this invention, and may be any suitable value, such as 640 and 480, respectively. The image digitizer 150 then converts the representation of the light energy intensity information in each pixel of an image frame to digital form.

The digital representations of the light energy intensities of all the pixels for each of a series of consecutively stored moving video image frames are then transmitted by the image digitizer 150 to the video encoder 160 as a video signal using conventional techniques. The image digitizer 150 of the transmission terminal 200 to be used in conjunction with the present invention of the converter 10 may suitably comprise any device which provides to the video encoder 160 a video signal which is comprised of a digitized bit stream representation of the spatial light energy intensity variations of moving video image frames.

The video encoder 160 encodes the video signal it receives from the image digitizer 150 into a compressed form that comprises a plurality of video signal parameter bit streams. The video encoder 160 utilizes well known algorithms for encoding the video signal. These encoding algorithms, such as DCT, as explained below, are defined by the video transmission standard at which the video encoder 160 is configured to operate. For example, the video transmission standard may require that the DCT coefficient bit stream be encoded using an image frame rate of twenty-frames/sec. Similarly, the video transmission standard at which the video decoder 190 is configured to operate defines the algorithms used for decoding or decompressing the compressed bit stream it receives back into a video signal.

The video transmission standard at which the video encoder 160 is configured to operate, for purposes of describing this invention, is different from the video transmission standard at which the video decoder 190 in the reception terminal 250 is configured to operate. As described below, the converter 10 converts the compressed bit stream provided from the transmission terminal 200 to a converted compressed bit stream that is encoded using a video transmission standard that may be decoded by the video decoder 190.

For clarity and ease of reference, the video transmission standard at which encoding is performed at the transmission terminal 200 is defined as a first video transmission standard. The video transmission standard at which decoding is performed at the reception terminal 250 is defined as a second video transmission standard. Also, a first compressed bit stream is defined as the compressed bit stream that is encoded at the transmission terminal 200, and a second compressed bit stream is defined as the compressed bit stream that is encoded at the reception terminal 250 by the converter 10.

According to this invention, the conversion of the first compressed bit stream into the second compressed bit stream by the converter 10 requires that the same fundamental algorithms, such as the DCT, that are used for compressing the video signal representation of the moving video image frames into a plurality of video signal parameter bit streams at the transmission terminal 200 also be used at the reception terminal 250 for decompressing the converted compressed bit stream. In other words, the transmission terminal 200 and the reception terminal 250 must operate on compressed bit streams that are comprised of identical types of video signal parameter bit streams. The video transmission standards that are currently used comply with this operating requirement.

By way of example, the use of the converter 10 in the system 5 is described with respect to a first compressed bit stream that is comprised of a bit stream of DCT image coding coefficients, a bit stream of motion compensation coding vectors and a bit stream of operating mode codewords. These techniques of compressing a video signal are described below in sufficient detail required for highlighting the aspects of this invention. For a more detailed description of these compression techniques, see Arun N. Netravali and Barry C. Haskell, *Digital Pictures* pp. 204–05 (1988). It is to be understood, however, that the video signal parameter bit streams described here are only exemplary of the video signal parameter bit streams that may be converted in accordance with the present invention.

Figure 2:
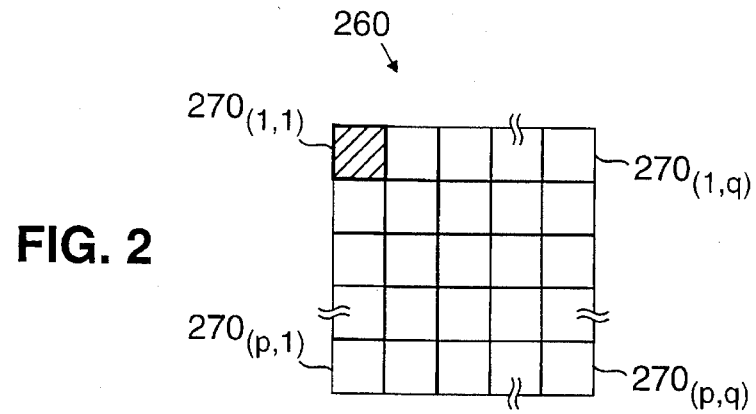
FIG. 2 illustrates a DCT image frame.

The video encoder 160 performs DCT image coding by converting the video signal, in other words, the digital bit representations of the light energy intensity of pixels in the spatial domain for the moving video image frames, to digital DCT coefficients in the frequency domain. A video signal representation of an image frame is partitioned into sections, called blocks, where each block comprises a plurality of pixels. DCT image coding is performed on these blocks. An encoded DCT image frame 260 is shown in FIG. 2. The DCT image frame 260 is comprised of a plurality of DCT blocks $270_{1,2,\ldots,p;1,2,\ldots,q}$ arranged in matrix form, where p is equal to the number of rows and q is equal to the number of columns of DCT blocks in the DCT image frame 260. The location of the DCT blocks in the encoded DCT image frame 260 corresponds spatially to the location of those pixels in the blocks of the image frame that are encoded by DCT image encoding. In other words, a particular DCT block in the DCT image frame 260 has row and column indices that correspond spatially to the rows and columns of pixels of an image frame that have been encoded in the form of DCT coefficients.

The DCT coefficients for the DCT blocks of the DCT image frame 260 are then quantized by the video encoder 160 using conventional techniques. Quantization exploits the well known fact that an image frame typically consists of pixels or blocks of pixels where most of the energy is concentrated in the low frequency range. As a result, fewer bits are used to quantize the lower frequency DCT coefficients, and more bits are used to quantize the higher frequency DCT coefficients.

By way of example, the video encoder 160 in the system 5 also is described as performing, using well-known techniques, motion compensation image coding on the video signal it receives. Motion compensation image processing involves the encoding of the digital bit stream representation of the spatial light energy intensities of the moving video image frames using DCT blocks, called differential DCT blocks, and motion compensation vectors. Motion compensation encoding is performed when a reference image frame and an incoming image frame have a high degree of correlation. The motion compensation vectors and the differential DCT block bit streams provide sufficient data bits for re-constructing successively transmitted image frames using a reduced number of bits.

An operating mode codeword is also generally assigned by the video encoder 160. The operating mode codeword indicates the compression method selected by the video encoder 160 for encoding blocks of an image frame. For instance, the operating mode codeword may indicate that the video encoder may have either transmitted motion compensation vectors with quantized DCT coefficients of a differential block or, instead, just the quantized DCT coefficients representing a block in an incoming image frame.

The video encoder 160 entropy encodes and multiplexes the plurality of video signal parameter bit streams, including the DCT coefficient to create the first compressed bit stream. Entropy encoding is performed using any suitable data compression technique that is based upon the statistical occurrence of data patterns, such as Huffman coding. The channel 170 routes the compressed bit stream from the video encoder 160 to the converter 10.

In the present invention, the compressed bit stream provided by the video encoder 160 of the transmission terminal 200 is routed via the channel 170 to the input port 15 of the converter 10. If the channel 170 has a low bandwidth, then the first compressed bit stream may be modulated. In such a system, the modulated signal must be demodulated and converted back into the first compressed bit stream of digital bits by a demodulator, not shown, prior to processing at the converter 10. Similarly, modulation and demodulation of the second compressed bit stream output provided at output 105 of the converter 10 may be required for transmission on the channel 180, depending upon the type of decoding equipment that is included at the reception terminal 250 and depending upon the characteristics of the channel 180.

The converter 10 provides the second compressed bit stream at output 105 for routing via channel 180 to the video decoder 190 of the reception terminal 250. The video decoder 190 decompresses the second compressed bit stream using techniques well known in the art, and provides a video signal to the video display monitor 195 from which the transmitted moving video images may be re-constructed.

The video decoder 190 is comprised of any suitable component that decompresses the compressed bit stream it receives into a video signal. The display monitor 195 suitably comprises any video display device, such as a television set, that is used for displaying video signals.

Figure 3:
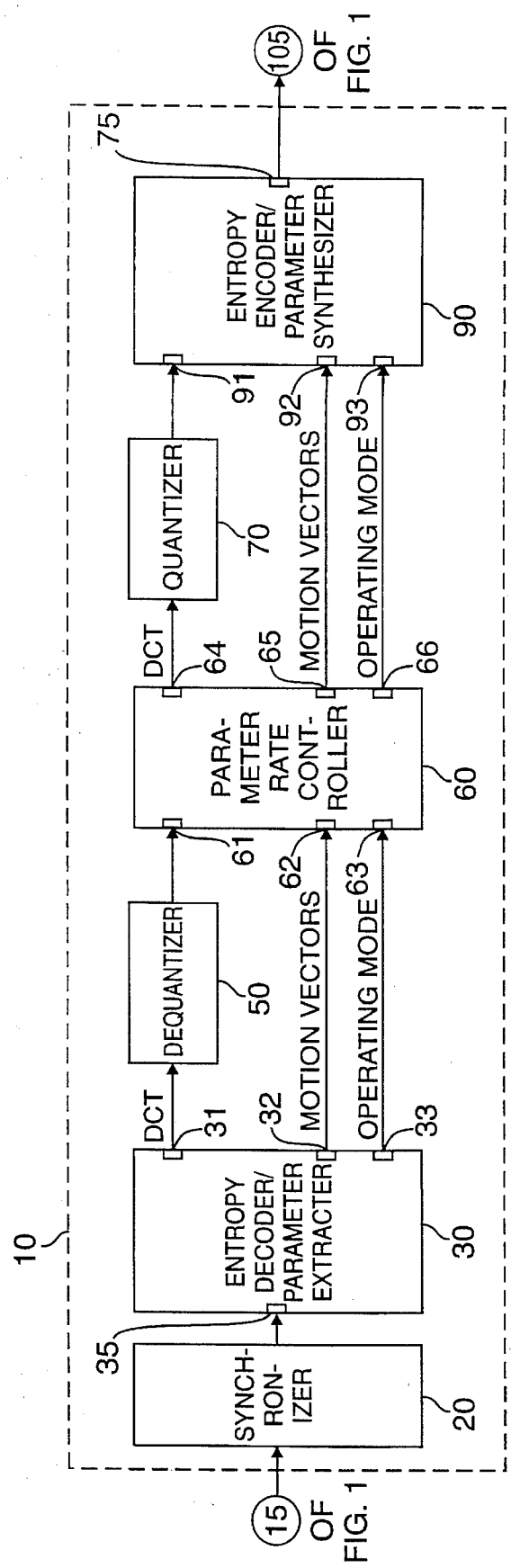
FIG. 3 illustrates a compressed bit stream converter suitable for use in the system of FIG. 1.

One embodiment of the converter 10 is shown in FIG. 3. The converter 10 is comprised of a plurality of interconnected circuits that is suitably implemented as a hardwired circuit. The hardwired circuit may, for example, be integrated on a very large scale integrated (VLSI) semiconductor chip. The standard components required for operating the circuits of the converter 10, such as, for example, a power supply, are not shown in FIG. 3 because they are well known in the art.

The converter 10 provides for the conversion of a first compressed bit stream encoded using a first video transmission standard to a second compressed bit stream encoded using a second video transmission standard without at any time converting the first compressed bit stream back to video signal form. Therefore, an additional video encoder, which is sometimes utilized for performing a conversion between compressed bit streams encoded at different video transmission standards, is not required to be included as part of the video decoding equipment at the reception terminal 250 according to the present invention. This results in significant cost savings because motion compensation coding circuits and circuits for conversion from the spatial image representations to DCT coefficients are not utilized. Further, a video decoder for converting DCT coefficients encoded using the first video transmission standard back to spatial image representations, in other words, video signal form, is likewise not required.

The circuits of the converter 10 comprise a synchronizer 20, an entropy decoder/video signal parameter extractor or ED/VSPE 30, a DCT dequantizer 50, a video signal parameter bit stream rate controller or parameter rate controller 60, a DCT quantizer 70, and an entropy encoder/video signal parameter synthesizer or EE/VSPS 90.

The synchronizer 20 is connected to the input port 15 of the converter 10 and an input port 35 of the ED/VSPE 30. The ED/VSPE 30 is further comprised of an output port 31 that is connected to the DCT dequantizer 50, and an output port 32 and an output port 33 which are connected, respectively, to an input port 62 and an input port 63 of the parameter rate controller 60. The DCT dequantizer 50 is connected to an input port 61 of the parameter rate controller 60. The parameter rate controller 60 is further comprised of an output port 64 that is connected to the DCT quantizer 70, and an output port 65 and an output port 66 which are connected, respectively, to an input port 92 and an input port 93 of the EE/VSPS 90. The DCT quantizer 70 is connected to an input port 91 of the EE/VSPS 90. An output port 95 of the EE/VSPS 90 provides the compressed bit stream at the output port 105 of the converter 10.

It is to be understood that the ED/VSPE 30 and the EE/VSPS 90 are exemplary of well-known circuits which may be utilized in conjunction with the parameter rate controller 60 for purposes of this invention. For example, the ED/VSPE 30 may be comprised of additional bit stream output ports and the EE/VSPS 90 may be comprised of additional bit stream input ports, respectively, depending on the number of video signal parameter bit streams used for encoding a video signal in compressed form using a particular video transmission standard. The parameter rate controller 60 is also an exemplary circuit, and may comprise additional video signal parameter bit stream input ports and video signal parameter bit stream output ports, similarly depending on the video transmission standard used for encoding a video signal as the first compressed bit stream.

Figure 4:
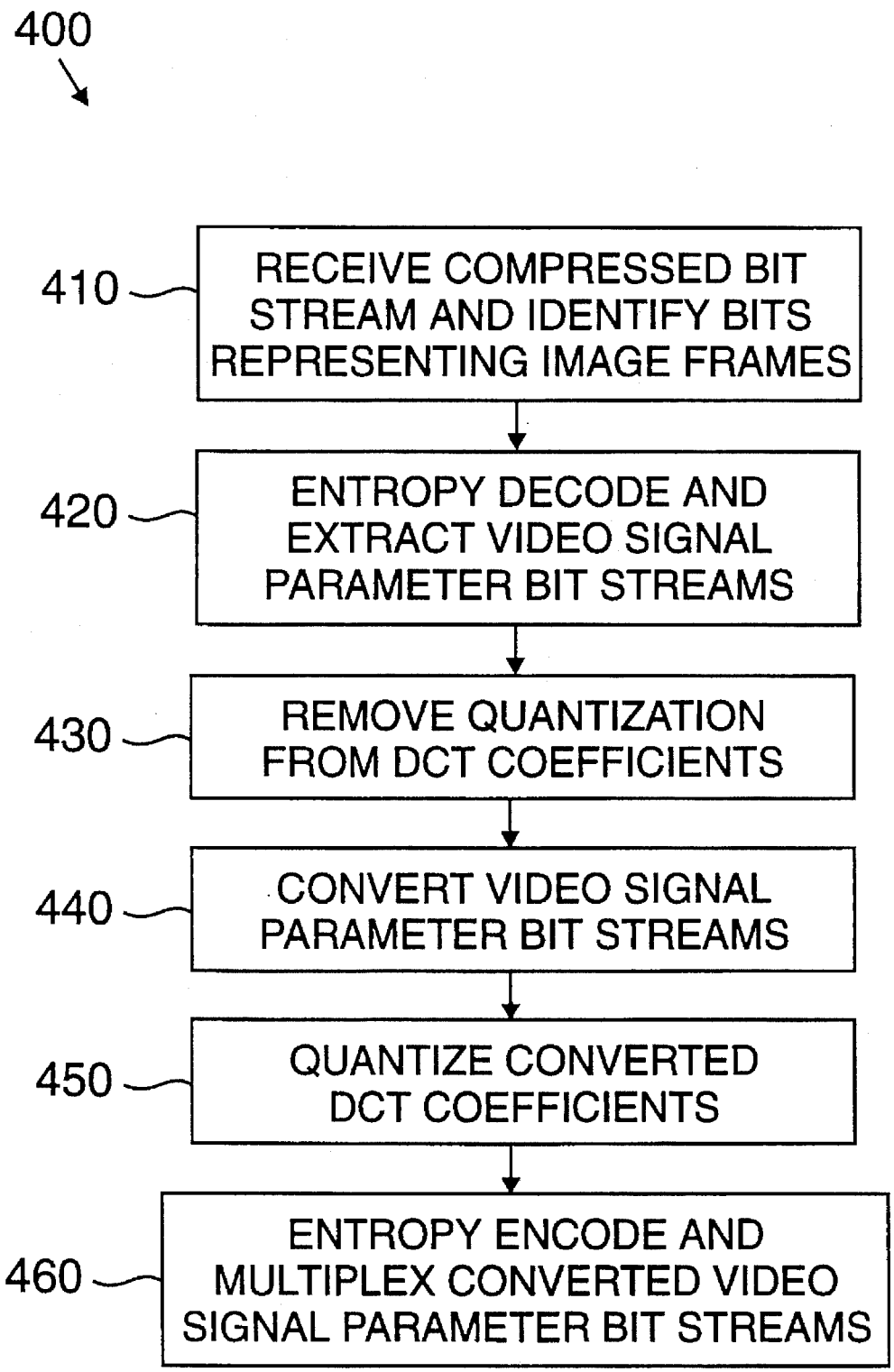
FIG. 4 is a flow diagram of a method of conversion of a compressed bit stream according to the present invention.

The process performed by the circuits in the converter 10 is described with reference to steps 410 through 460 of a conversion process 400, shown in FIG. 4. The process 400 generally explains how the first compressed bit stream, which is comprised of DCT coefficients, motion compensation vectors and an operating mode codeword, is converted at the converter 10. By way of example, the conversion of the encoded DCT coefficient bits with respect to differences in image frame rate between the first and second video transmission standard is described in greater detail below. It is to be understood, however, that the conversion may also be performed with respect to image resolution and other spatial and temporal image resolution parameters.

In step 410, the synchronizer 20 receives the first compressed bit stream encoded at the first video transmission standard from input 15 of the converter 10. The synchronizer 20 comprises a known circuit for providing a series of synchronization signals for identifying the start of the stream of bits representing an individual image frame. Synchronization is required because entropy encoding may vary the number of bits which are transmitted to represent an image frame. After identifying the bits that represent each successively transmitted image frame, the synchronizer 20 routes the series of synchronization signals along with the first compressed bit stream to the input port 35 of the ED/VSPE 30.

In step 420, the ED/VSPE 30 uses suitable entropy decoding tables, which are well known in the art, for extracting the plurality of entropy encoded video signal parameters from the compressed bit stream, and then entropy decoding the extracted entropy encoded video signal parameters. For instance, in the system 5, the ED/VSPE 30 uses the entropy decoding tables compatible with the first video transmission standard to extract the entropy encoded bit streams of quantized DCT coefficients, motion compensation vectors and operation mode codewords from the first compressed bit stream, and then to entropy decode these extracted video signal parameter bit streams.

In the system 5, the ED/VSPE 30 provides at the output 31 the bit stream of quantized DCT coefficients for further transmission to the DCT dequantizer 50. Bit streams of motion compensation vectors and operating mode codewords are provided at the output port 32 and the output port 33 of the ED/VSPE 30, respectively, for transmission to the input port 62 and the input port 63 of the parameter rate controller 60. It is noted that in systems not employing motion compensation, the motion vector information is not required.

In step 430, the DCT dequantizer 50 removes the quantization from the bit stream of quantized DCT coefficients using well known techniques. The resulting bit stream of DCT coefficients is then transmitted to the input 61 of the parameter rate controller 60.

In step 440, the parameter rate controller 60 converts the plurality of video signal parameter bit streams it receives, which are encoded using the first video transmission, to a plurality of video signal parameter bit streams which are encoded using the second video transmission standard. The conversion at the parameter rate controller 60 is suitably performed using conventional interpolation or decimation techniques. The circuit of the parameter rate controller 60 is suitably modifiable using well known techniques according to the parameters of the first and second video transmission standard for which the conversion is performed. In the system 5, the parameter rate controller 60 converts the bit stream of DCT coefficients, the bit stream of motion compensation vectors and the bit stream operating mode codewords, all encoded using the first video transmission standard, to a plurality of respective video signal parameter bit streams encoded using the second video transmission standard.

For purposes of this description, the first video transmission standard in the system 5 uses a lower bandwidth than the second video transmission standard. For example, the temporal resolution or the image frame rate at which the first compressed bit stream is encoded is less than that used for encoding the second compressed bit stream. Therefore, suitable interpolation techniques are used during the conversion at the parameter rate controller 60 for calculating the additional data bits that must be inserted into the video signal parameter bit stream representation of the video signal that is encoded using the first video transmission standard. The video signal parameter bit stream representation encoded using the first video transmission standard is coupled accordingly with these additionally calculated bits for providing the video signal parameter bit stream representation that is encoded using the second video transmission standard.

The conversion of the video signal parameter bit stream of DCT coefficients that is encoded using the first video transmission standard to the video signal parameter bit stream of DCT coefficients that is encoded using the second video transmission standard is now explained with reference to FIGS. 5 and 6 to highlight the advantages of this invention. For purposes of clarity, the conversion of DCT coefficients is explained only with reference to the DCT coefficient representation of spatially corresponding DCT blocks of the image frames.

Figure 5:
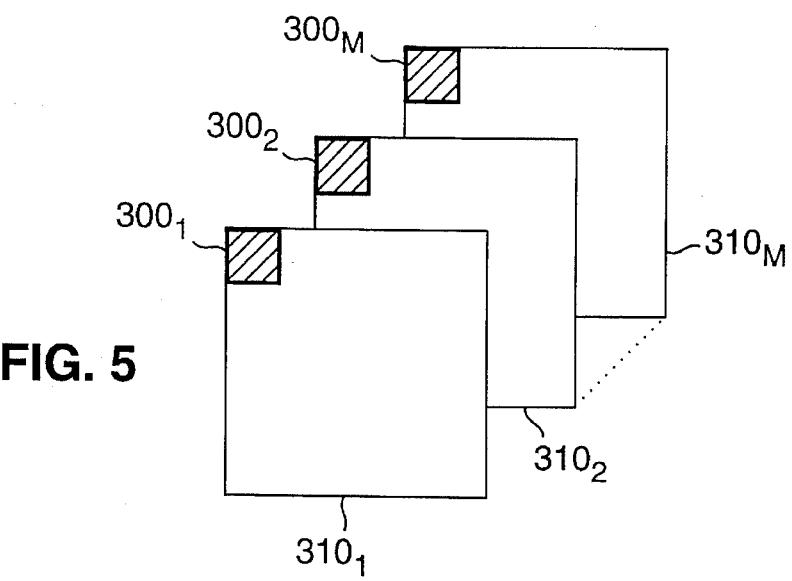
FIG. 5 is a series of transmitted moving video image frames that are represented using DCT coefficient bit stream.
Figure 6:
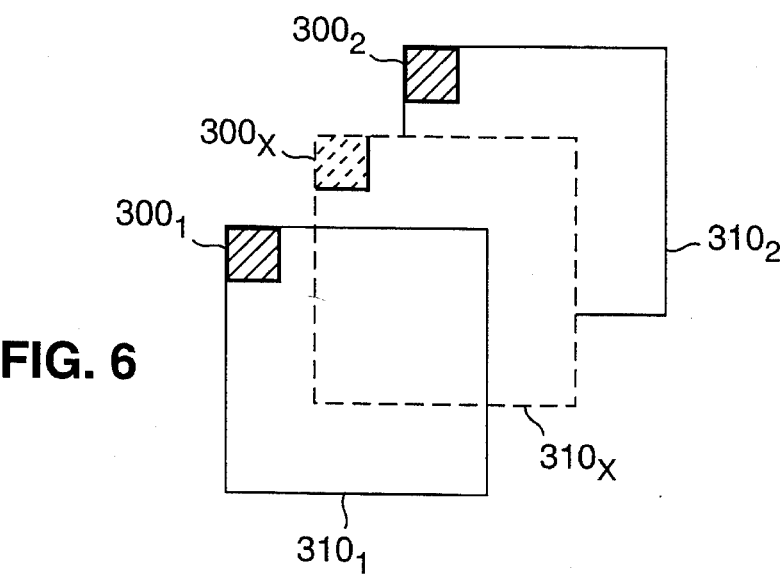
FIG. 6 illustrates the operation of the compressed bit stream converter on the DCT coefficient bit stream representations of the transmitted moving video image frames that are shown in FIG. 5.

FIG. 5 shows the DCT coefficient video signal parameter representations of the video signal as a series of DCT image frames $310_1$, $310_2$, ... $310_M$, which are respectively comprised of a plurality of blocks of DCT coefficients $300_1$, $300_2$, ... $300_M$. These DCT image frames $310_1$, $310_2$, ... $310_M$ represent an encoded version of the video signal representation of a series of consecutive moving video image frames that were digitized at the transmission terminal 200. The plurality of blocks of DCT coefficients $300_1$, $300_2$, ... $300_M$ comprise a part of the DCT coefficient bit stream for the DCT image frames $310_1$, $310_2$, ... $310_M$.

The plurality of blocks of DCT coefficients $300_1$, $300_2$, ... $300_M$ represent the encoded regions in a consecutive series of digitized image frames having the same spatial coordinates. By way of example, the spatial coordinates encoded in the DCT blocks $300_1$, $300_2$, ... $300_M$ are those corresponding to the upper left-most corner region of the digitized image frames. Consequently, FIG. 5 shows the DCT blocks $300_1$, $300_2$, ... $300_M$ as those DCT blocks located, respectively, in the upper left-most corner of the DCT image frames $310_1$, $310_2$, ... $310_M$.

The parameter rate controller 60 may suitably use linear interpolation techniques for converting the DCT coefficient bit stream between different video transmission standards. The use of linear interpolation is chosen to demonstrate clearly how the parameter rate controller 60 converts between different video transmission standards, however, any interpolation technique may be used.

The linear interpolation equation: $Par_{I,J} = (1-J/N) Par_{0,J} + Par_{1,J} (J/N)$ is used here for calculating the additional DCT coefficient bits that must be inserted into the DCT coefficient video signal parameter bit stream. The variable $Par_{0,J}$ is the video signal parameter bit stream representation for a block of a reference image frame encoded using the first video transmission standard. The variable $Par_{1,J}$ is the video signal parameter bit stream representation of a block of an incoming image frame encoded using the first video transmission standard that spatially corresponds to the block represented by $Par_{0,J}$. The variable I in equation designates the particular video signal parameter being converted, in other words, it designates the video signal parameter for which additional bits are being calculated. The variable N is a function of the difference between the image frame rate used for encoding a video signal using the first video transmission standard and the image frame rate used for encoding a video signal using the second video transmission standard. For example, if the image frame rate for the first video transmission standard is equal to twenty frames/sec and the image frame rate for the second video transmission standard is equal to forty frames/sec, N is equal to two. J is a variable that defines the number of times that the linear interpolation equation is performed. The equation is performed N+1 times for the values of J equal to 0,1, ... N. The N+1 consecutively calculated DCT coefficients comprise all the DCT coefficients that comprise the video signal parameter bit stream representation for the reference and incoming image frame as encoded using the second video transmission standard. Similar calculations may suitably be performed for all other DCT blocks in the reference and incoming image frame, and also similarly for all DCT blocks in successive DCT image frames.

A typical DCT coefficient interpolation is now described for the DCT blocks $300_1$ and $300_2$ of the DCT image frames $310_1$ and $310_2$, which, by way of example, comprise a reference and incoming image frame, respectively. Assume that the image frame rate for encoding DCT coefficients using the first video transmission standard is 20 frames/sec, and the image frame rate for encoding DCT coefficients using the second video transmission standard is 40 frames/sec. $Par_{0,J}$ would represent the DCT coefficients for the DCT block $300_1$, and $Par_{1,J}$ would represent the DCT coefficients for the DCT block $300_2$. Since N would be equal to 2, additional bits $Par_{1,J}$ would be calculated according to the linear interpolation equation using well known techniques to represent a DCT block $300_X$ of a DCT image frame $310_X$. The DCT coefficients for the DCT block $300_X$ of the DCT image frame block $310_X$ would accordingly be inserted into the DCT coefficient bit stream encoded using the first video transmission standard to provide the DCT coefficient bit stream encoded using the second video transmission standard that represents this spatial region of the reference and incoming image frames. FIG. 6 shows the DCT image frame $310_X$ as it would be inserted between the DCT image frames $310_1$ and $310_2$, with the DCT coefficients representing the image frame $310_X$ inserted accordingly. The DCT coefficients for all other DCT blocks in the image frame $310_X$ would also be calculated in a similar fashion.

The DCT coefficients calculated for this block of the image frame $310_X$, as well as the result of similar calculations for other blocks for the image frame $310_X$, would comprise the bit stream of DCT coefficients that is encoded using the second video transmission standard. In addition, the motion compensation vectors in the first compressed bit stream may be interpolated by similar interpolation techniques to obtain a bit stream of motion compensation vectors encoded using the second video transmission standard. Also, the parameter rate controller 60 suitably converts the operating mode codeword bit stream for the first compressed bit stream to one that suitably corresponds to the converted bit stream.

Alternatively, the parameter rate controller 60 may be suitably utilized to decimate a compressed bit stream by converting a compressed bit stream representation that is encoded using an image frame rate characteristic of a first video transmission standard that is higher than the image frame rate characteristic of a second video transmission standard.

The converted bit streams of DCT coefficients, motion compensation vectors and operation mode codewords are provided at the outputs 64, 65 and 66 of the parameter rate controller 60, respectively. In step 450, the converted DCT coefficients, as routed from the output port 64 of the parameter rate controller 60, are quantized by the DCT quantizer 70. The DCT quantizer 70 is a conventional circuit that quantizes the DCT coefficients according to the second video transmission standard. Then, the converted quantized DCT coefficients are transmitted to the input 91 of the EE/VSPS 90.

The converted bit streams of motion compensation vectors and operation mode codewords are routed, respectively, from the output 65 and the output 66 of the parameter rate controller 60 to the input 92 and the input 93 of the EE/VSPS 90. In step 460, the EE/VSPS 90 entropy encodes and then multiplexes the converted plurality of video signal parameter bit streams into the second compressed bit stream. The second compressed bit stream is routed from output port 105 of the converter 10 to the reception terminal 250 via the channel 180. The second compressed bit stream provided at the output 105 is, at this point, encoded using the second video transmission standard. The second compressed bit stream is decoded into the video signal by the video decoder 190. The video signal is then suitably displayed using the video display monitor 195.

In an alternative embodiment, all or some of the functions of the converter 10 described above may be suitably implemented in software by a conventional microprocessor.

It is to be understood that the embodiments and variations shown and described above are illustrative of the principles of this invention only and that various modifications may be implemented by those skilled in the art without departing from the scope and spirit of the invention.

I claim:

1. A method for converting a first compressed bit stream representation of a video signal that is encoded using a first video transmission standard to a second compressed bit stream representation of the video signal that is encoded using a second video transmission standard, comprising the steps of:

receiving the first compressed bit stream,
wherein said first compressed bit stream is comprised of a plurality of entropy encoded bits that is encoded using the first video transmission standard;

identifying a plurality of bits in the first compressed bit stream which comprise a reference and an incoming image frame;

entropy decoding the plurality of bits;

converting the plurality of bits to a plurality of bits encoded using the second video transmission standard; and, entropy encoding the converted plurality of bits to form the second compressed bit stream representation of the reference and the image frame.

2. The method of claim 1, wherein the plurality of bits is comprised of a plurality of motion compensation vector bits.

3. The method of claim 1, wherein the conversion is performed with respect to the difference between the image frame rate encoded using the first video transmission standard and the second video transmission standard.

4. The method of claim 1, wherein the conversion is performed with respect to the difference between the image frame resolution encoded using the first video transmission standard and the second video transmission standard.

5. The method of claim 1, wherein the conversion is performed by interpolation.

6. The method of claim 1, wherein the conversion is performed by decimation.

7. A method for converting a first compressed bit stream representation of a video signal that is encoded using a first video transmission standard to a second compressed bit stream representation of the video signal that is encoded using a second video transmission standard comprising the steps of:

receiving the first compressed bit stream,
  wherein said video signal is comprised of a digital bit representation of a plurality of transmitted moving video image frames, and
  wherein said first compressed bit stream is comprised of a plurality of bit streams that is comprised of a plurality of entropy encoded bits, respectively, and encoded using the first video transmission standard, said plurality of bit streams being representative of the digital bit representation of the plurality of transmitted moving video image frames;

identifying a plurality of bits in the respective plurality of bit streams which comprise a reference and an incoming image frame;

extracting from the first compressed bit stream and then entropy decoding the plurality of bits in the respective plurality of bit streams;

converting the plurality of bits in the respective plurality of bit streams to a plurality of bits in a respective plurality of bit streams that is encoded using the second video transmission standard; and, entropy encoding and then multiplexing the converted plurality of bits in the respective plurality of bit streams to provide the second compressed bit stream representation of the reference and image frame.

8. The method of claim 7, wherein the first compressed bit stream is comprised, in part, of a bit stream of a plurality of entropy encoded quantized DCT coefficients and wherein the method of claim 1 further comprises the steps of:

removing quantization from the plurality of quantized DCT coefficients after the step of entropy decoding and before the step of converting; and, quantizing the converted plurality of DCT coefficients after the step of converting and before the step of entropy encoding.

9. The method of claim 8, wherein the conversion is performed with respect to the difference between the image frame rate encoded using the first video transmission standard and the second video transmission standard.

10. The method of claim 8, wherein the conversion is performed with respect to the difference between the image frame resolution encoded using the first video transmission standard and the second video transmission standard.

11. The method of claim 8, wherein the conversion is performed by interpolation.

12. The method of claim 8, wherein the conversion is performed by decimation.

13. The method of claim 7, wherein the first compressed bit stream is comprised, in part, of a bit stream of a plurality of entropy coded motion compensation vector bits.

14. The method of claim 7, wherein the first compressed bit stream is comprised, in part, of a bit stream of a plurality of entropy coded operating mode codeword bits.

15. An apparatus for converting a first compressed bit stream representation of a video signal that is encoded using a first video transmission standard to a second compressed bit stream representation of the video signal that is encoded using a second video transmission standard comprising:

a synchronizer circuit for receiving the first compressed bit stream,
  wherein said video signal is comprised of a digital bit representation of a plurality of transmitted moving video image frames, and
  wherein said first compressed bit stream is comprised of a plurality of bit streams that is comprised of a plurality of entropy encoded bits, respectively, and encoded using the first video transmission standard, said plurality of bit streams being representative of the digital bit representation of the plurality of transmitted moving video image frames, said synchronizer circuit identifying a plurality of bits in the respective plurality of bit streams which comprise a reference and an incoming image frame;

an entropy decoder/video signal parameter extractor (ED/VSPE) circuit for extracting from the first compressed bit stream and then entropy decoding the plurality of bits in the respective plurality of bit streams;

a parameter rate controller circuit for converting the plurality of bits in the respective plurality of bit streams to a plurality of bits in a respective plurality of bit streams that is encoded using the second video transmission standard; and, an entropy encoder/video signal parameter synthesizer (EE/VSPS) circuit for entropy encoding and then multiplexing the converted plurality of bits in the respective plurality of bit streams to provide the second compressed bit stream representation of the reference and incoming image frame.

16. The apparatus of claim 15, wherein the first compressed bit stream is comprised, in part, of a bit stream of a plurality of entropy encoded quantized DCT coefficients and wherein the apparatus further comprises:

a DCT dequantization circuit for removing quantization from the plurality of quantized DCT coefficients that is entropy decoded by the ED/VSPE circuit; and, a DCT quantization circuit for quantizing the converted plurality of DCT coefficients that is encoded using the second video transmission standard by the parameter rate controller circuit means.

17. The apparatus of claim 16, wherein the conversion is performed with respect to the difference between the image frame rate encoded using the first video transmission standard and the second video transmission standard.

18. The apparatus of claim 16, wherein the conversion is performed with respect to the difference between the image frame resolution encoded using the first video transmission standard and the second video transmission standard.

19. The apparatus of claim 15, wherein the conversion is performed by interpolation.

20. The apparatus of claim 15, wherein the conversion is performed by decimation.

21. The apparatus of claim 15, wherein the synchronizer circuit, the ED/VSPE circuit, the parameter rate controller circuit, the EE/VSPS circuit, the DCT dequantization circuit and the DCT quantization circuit are all integrated on a semiconductor chip.

22. The apparatus of claim 15, wherein a microprocessor executes an algorithm from a software code to implement the functions of the synchronizer circuit, the ED/VSPE circuit, the parameter rate controller circuit, the EE/VSPS circuit, the DCT dequantization circuit and the DCT quantization circuit.

\* \* \* \* \*